No. 677,867. Patented July 9, 1901.
J. W. HAWKINS.
VEHICLE TIRE.
(Application filed Dec. 20, 1900.)

(No Model.)

WITNESSES.
Wilson C. Sterling
F. D. Leslie

INVENTOR.
John W. Hawkins
per Frank Higley
ATTORNEY

UNITED STATES PATENT OFFICE.

JOHN W. HAWKINS, OF CUYAHOGA FALLS, OHIO.

VEHICLE-TIRE.

SPECIFICATION forming part of Letters Patent No. 677,867, dated July 9, 1901.

Application filed December 20, 1900. Serial No. 40,505. (No model.)

*To all whom it may concern:*

Be it known that I, JOHN W. HAWKINS, a citizen of the United States, residing at Cuyahoga Falls, in the county of Summit and State of Ohio, have invented a new and useful Improvement in Vehicle-Tires, of which the following is a specification.

My invention relates to certain novel features of construction of the tire and means for attaching the same to the felly; and the object of my invention is to provide a simple, cheap, and efficient means of attaching a tire of rubber or other yielding material to a wheel and holding the tire firmly to the wheel when attached.

My invention is illustrated in the accompanying drawings, in which—

Figure 1:
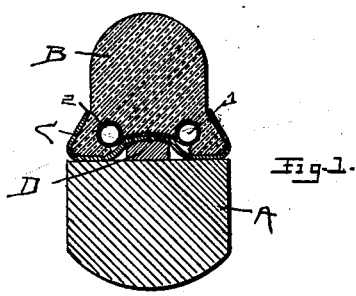
Figure 2:
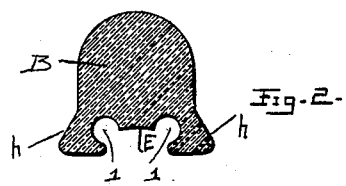
Figure 3:
Figure 4:
Figure 5:
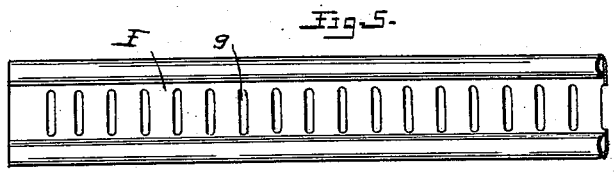
Figure 6:
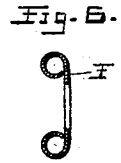

Figure 1 is a transverse section of a rubber tire and felly of a wheel, showing the tire attached to the felly. Fig. 2 is a transverse section of the rubber tire. Fig. 3 is a transverse section of the metallic band used to hold the tire on the wheel. Fig. 4 is a transverse section of the inner rim. Fig. 5 is a view of the metallic band shown in Fig. 3. Fig. 6 is a transverse section of the band shown in Fig. 5.

Similar characters refer to similar parts throughout the several views.

In the drawings, A represents the felly of a wheel, and B an elastic tire of the class known as "solid-rubber" tires. Attached to the felly of the wheel in any suitable manner is a rim C, preferably constructed of metal. The rim C is provided on each side with annular flanges, forming on the wheel an annular channel for the reception of the elastic tire. The rim also has an upward bend in the middle, forming an annular ridge K. There may be interposed between the felly and the ridge K of the rim a rib D, as shown in Fig. 1. The tire B has at its base flanges L L, of suitable form, to engage the flanges of the rim C, and is also provided with a channel E and recesses 1 1. The tire B is fastened to the rim by means of the band F. This band is preferably constructed of sheet metal, having its sides turned or rolled so that the same will fit the recesses 1 1 of the tire B. Before use in fastening the tire to the rim the band F is bent, as shown in Fig. 3, so that its rolled sides 2 2 are the same or a less distance apart than the recesses 1 1 of the tire before fastened in the rim. The band F is preferably provided with a series of slots g, which render the band more flexible and better adapted for use for the purposes herein specified. When it is desired to fasten the tire to a wheel, the rim C is first fastened to the felly and, if desired, the rib D interposed between the felly and rim. The band F is placed in the channel of the tire B, the rolled sides 2 2 of the band fitting into the recesses 1 1 in the tire. The tire B, with band F attached, is then placed in the rim C, the lower flanges of the same fitting to the flanges of the rim and the ridge K of the rim engaging the central part of the band. The tire B is then subjected to pressure from without, which forces the center line of the band F upward into the form shown in Fig. 1, driving the sides of the band outwardly, as shown in Fig. 1, thus clenching the lower part of the tire B to the flanges of the rim C and firmly holding the tire upon the wheel. The rib D increases the bearing-surface of the rim upon the felly.

In clenching the tire the central part of the band F is preferably driven upward to a point slightly above the center line of the rolled sides, so that the band in contact with the ridge K tends to hold the tire firmly in position. I do not wish to limit my invention to the specific form of tire, band, or rim shown in the drawings, it being manifest that modifications of the forms shown in the drawings might be readily made without departing from my invention.

What I claim as my invention, and desire to secure by Letters Patent, is—

1. The means for attaching a yielding tire to a wheel, consisting in an annular rim attached to the felly and having flanges adapted to form an annular channel, an annular ridge extending into said channel and a band having its sides in engagement with the base of the tire and having its central part adapted to engage the annular ridge of the rim and to drive outwardly the sides of the band clenching the base of the tire to the flanges of the rim when pressure is applied to the outer surface of the tire, substantially as shown and described.

2. In a vehicle-tire, the combination of a rim having flanges adapted to form an annular channel and having an annular ridge extending into said channel, an elastic tire adapted to be inserted in said rim and provided at its base with an annular channel, a band having sides in engagement with the sides of the channel of the tire and having its central part adapted to engage the annular ridge in the rim and to drive outwardly the sides of the band clenching the base of the tire to the flanges of the rim when pressure is applied to the outer surface of the tire, substantially as and for the purposes shown and described.

3. In a vehicle-tire, the combination of a rim having flanges adapted to form an annular channel contracted toward its mouth and having an annular ridge extending into said channel, an elastic tire adapted to be inserted in said rim and provided at its base with an annular channel, means for securing said tire in said rim, consisting of a band having sides in engagement with the sides of the channel of the tire and having its intermediate part adapted to engage the annular ridge in the rim and to drive outwardly the sides of the band clenching the base of the tire to the flange of the rim, when pressure is applied to the outer surface of the tire, substantially as shown and described.

4. In a vehicle-wheel, the combination of a rim attached to the felly and having flanges forming a channel contracted toward its peripheral portion, and having an annular ridge extending into said channel, a yielding tire adapted to be mounted in said rim and provided at its base with a channel, means for securing the tire in the rim consisting of a band having rolled sides in engagement with recesses in the sides of the channel of the tire and having its intermediate part adapted to engage the ridge in the rim and when subjected to pressure to drive outwardly the sides of the band clenching the base of the tire to the flanges of the rim substantially as shown and for the purposes described.

5. In a vehicle-tire, in combination, a felly, a rim attached to the felly and having side flanges forming an annular channel contracted toward its mouth and having an annular ridge extending into said channel, a supporting-rib interposed between the felly and said annular ridge, a rubber tire mounted in said rim and provided at its base with an annular channel, means for securing said tire in said rim consisting of a band having its sides in engagement with the sides of the channel of the tire and having its central part adapted to engage the annular ridge in the rim and when subjected to pressure to drive outwardly the sides of the band clenching the base of the tire in the flanges of the rim, substantially as shown and for the purposes described.

In testimony whereof I have signed my name to this specification in the presence of two subscribing witnesses.

JOHN W. HAWKINS.

Witnesses:
  WILSON C. STERLING,
  T. D. LESLIE.